(12) United States Patent
Narayanaswamy et al.

(10) Patent No.: US 10,129,182 B2
(45) Date of Patent: Nov. 13, 2018

(54) METHODS AND APPARATUS FOR PROVIDING SERVICES IN DISTRIBUTED SWITCH

(75) Inventors: Krishna Narayanaswamy, Saratoga, CA (US); Jean-Marc Frailong, Los Altos Hills, CA (US); Anjan Venkatramani, Los Altos, CA (US); Srinivasan Jagannadhan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 233 days.

(21) Appl. No.: 13/538,328

(22) Filed: Jun. 29, 2012

(65) Prior Publication Data
US 2014/0006549 A1 Jan. 2, 2014

(51) Int. Cl.
*G06F 15/16* (2006.01)
*H04L 12/931* (2013.01)
(Continued)

(52) U.S. Cl.
CPC .......... *H04L 49/355* (2013.01); *H04L 45/38* (2013.01); *H04L 67/327* (2013.01); *H04L 45/54* (2013.01); *H04L 49/25* (2013.01)

(58) Field of Classification Search
CPC ......... H04L 45/38; H04L 45/54; H04L 49/25; H04L 49/355; H04L 67/327;
(Continued)

(56) References Cited

U.S. PATENT DOCUMENTS 6,097,698 A * 8/2000 Yang ................ H04Q 11/0478
370/231
6,798,746 B1 * 9/2004 Kloth .................... H04L 47/20
370/235
(Continued)

FOREIGN PATENT DOCUMENTS

EP   1506494 A1   2/2005
WO  03096214 A1  11/2003

OTHER PUBLICATIONS

European Search Report dated Oct. 28, 2013 for European Patent Application No. 13165633.
(Continued)

*Primary Examiner* — Dustin Nguyen
(74) *Attorney, Agent, or Firm* — Cooley LLP

(57) ABSTRACT

In some embodiments, a non-transitory processor-readable medium stores code representing instructions to be executed by a processor. The code causes the processor to receive, at an edge device, a first data unit having a characteristic. The code causes the processor to identify, at a first time, an identifier of a service module associated with the characteristic in response to each entry from a set of entries within a flow table not being associated with the characteristic. The code causes the processor to define an entry in the flow table associated with the characteristic and the identifier of the service module. The code causes the processor to send the first data unit to the service module. The code causes the processor to receive, at the edge device, a second data unit
(Continued)

Flow Table 600

| Service Module ID 610 | Counter 620 | Characteristic ID 630 |
|---|---|---|
| 1 | 25 | 10 |
|   |    | 37 |
| 2 | 72 | 5 |
|   |    | 21 |
|   |    | 17 |
| 7 | 5/msec | 54 |
| ⋮ | | |
| $SM_N$ | $C_M$ | $CID_T$ | having the characteristic, and send the second data unit to the service module based on the entry.

26 Claims, 6 Drawing Sheets

(51) Int. Cl.
*H04L 29/08* (2006.01)
*H04L 12/721* (2013.01)
*H04L 12/947* (2013.01)
*H04L 12/741* (2013.01)

(58) Field of Classification Search
CPC ..... H04L 12/2854; H04L 29/06; H04L 45/66; H04L 47/20; H04L 63/0227; G06F 9/45533; G06F 9/5083
USPC .......................................................... 709/217
See application file for complete search history.

(56) References Cited

U.S. PATENT DOCUMENTS

| | | | | |
|---|---|---|---|---|
| 7,167,924 | B1* | 1/2007 | Symonds | G06Q 20/10 705/43 |
| 7,738,469 | B1 | 6/2010 | Shekokar et al. | |
| 7,764,611 | B2 | 7/2010 | Rijhsinghani et al. | |
| 7,891,001 | B1 | 2/2011 | Greenawalt | |
| 8,094,575 | B1 | 1/2012 | Vadlakonda et al. | |
| 8,762,534 | B1* | 6/2014 | Hong | G06F 9/505 370/389 |
| 8,914,878 | B2* | 12/2014 | Burns | H04L 63/1441 726/13 |
| 2003/0002494 | A1* | 1/2003 | Kuukankorpi | H04L 29/12009 370/386 |
| 2003/0069973 | A1* | 4/2003 | Ganesan | H04L 29/06 709/226 |
| 2003/0163737 | A1 | 8/2003 | Roskind | |
| 2003/0212776 | A1 | 11/2003 | Roberts et al. | |
| 2004/0010712 | A1* | 1/2004 | Hui | H04L 63/0227 726/15 |
| 2006/0039364 | A1 | 2/2006 | Wright | |
| 2006/0092971 | A1* | 5/2006 | Okita | H04L 12/2854 370/468 |
| 2007/0083625 | A1* | 4/2007 | Chamdani | H04Q 3/0045 709/223 |
| 2007/0180226 | A1* | 8/2007 | Schory | H04L 29/12481 713/153 |
| 2007/0180513 | A1* | 8/2007 | Raz | H04L 29/12481 726/12 |
| 2008/0313318 | A1* | 12/2008 | Vermeulen | G06F 9/45533 709/223 |
| 2009/0037445 | A1* | 2/2009 | Ushiyama | H04L 67/104 |
| 2010/0158003 | A1 | 6/2010 | Rijhsinghani et al. | |
| 2010/0180334 | A1* | 7/2010 | Chen | H04L 29/12584 726/13 |
| 2011/0010481 | A1 | 1/2011 | Hamadani et al. | |
| 2011/0096781 | A1 | 4/2011 | Aybay | |
| 2012/0042006 | A1* | 2/2012 | Kiley | G06F 17/30867 709/203 |
| 2012/0144014 | A1* | 6/2012 | Natham | H04L 45/66 709/224 |
| 2012/0297491 | A1* | 11/2012 | Schory | H04L 29/12481 726/26 |
| 2012/0331127 | A1* | 12/2012 | Wang | G06F 9/5083 709/224 |
| 2012/0331146 | A1* | 12/2012 | Hsu | H04L 67/104 709/226 |
| 2013/0230047 | A1* | 9/2013 | Subrahmaniam | H04L 47/2441 370/392 |
| 2013/0308645 | A1* | 11/2013 | Karino | H04L 47/10 370/392 |
| 2014/0003232 | A1* | 1/2014 | Guichard | H04L 67/16 370/230 |
| 2014/0016648 | A1* | 1/2014 | Hidaka | H04L 49/15 370/400 |
| 2014/0019639 | A1* | 1/2014 | Ueno | H04L 61/103 709/238 |
| 2014/0108600 | A1* | 4/2014 | Cabillic | G06F 8/71 709/217 |

OTHER PUBLICATIONS

European Search Report dated Oct. 28, 2013 for European Patent Application No. 13165566.4.
Office Action for U.S. Appl. No. 13/538,344 dated Jun. 6, 2014.
Office Action for U.S. Appl. No. 13/538,344 dated Jan. 29, 2015.
Office Action for U.S. Appl. No. 13/538,344 dated Jul. 7, 2015.
Second Office Action for Chinese Patent Application No. 201310159634.7 dated Sep. 28, 2016 (Partial Translation Provided).
Office Action for U.S. Appl. No. 13/538,344 dated Sep. 15, 2016.
Office Action for European Patent Application No. 13165566.4 dated Apr. 29, 2016.
Office Action for Chinese Patent Application No. 2013101597091 dated Jul. 19, 2016.
Search Report for Chinese Patent Application No. 2013101597091 dated Jul. 5, 2016.
First Office Action received for Chinese Application No. 201310159709.1, dated Dec. 7, 2015.
Search Report for Chinese Application No. 201310159634.7, dated Dec. 11, 2015.
First Office Action received for Chinese Application No. 201310159634.7, dated Jan. 14, 2016.
Office Action for U.S. Appl. No. 13/538,344 dated Mar. 15, 2016.
Office Action for U.S. Appl. No. 13/538,344, dated Jan. 12, 2017, 27 pages.
Third Office Action for Chinese Application No. 201310159709.1, dated Dec. 28, 2016, 7 pages.
Fourth Office Action for Chinese Application No. 201310159709.1, dated Jul. 5, 2017.
Office Action, dated Oct. 10, 2017, issued for U.S. Appl. No. 13/538,344.
Examination Report, dated Oct. 20, 2017, for EP Application No. 13165566.4.

* cited by examiner

Flow Table 600

| Service Module ID 610 | Counter 620 | Characteristic ID 630 |
|---|---|---|
| 1 | 25 | 10 |
| | | 37 |
| 2 | 72 | 5 |
| | | 21 |
| | | 17 |
| 7 | 5/msec | 54 |
| ⋮ | | |
| $SM_N$ | $C_M$ | $CID_T$ |

FIG. 6

Flow Table 700

| Service ID 710 | Characteristic ID 720 |
|---|---|
| 100 | 10 |
| 120 | 20 |
| 250 | 30 |
| ⋮ | |
| $S_N$ | $CID_N$ |

FIG. 7

METHODS AND APPARATUS FOR PROVIDING SERVICES IN DISTRIBUTED SWITCH

CROSS-REFERENCE TO RELATED APPLICATION

This application is related to co-pending U.S. patent application Ser. No. 13/538,344, filed on Jun. 29, 2012, and entitled "Methods and Apparatus for Providing Services in a Distributed Switch," which is incorporated herein by reference in its entirety.

BACKGROUND

Some embodiments described herein relate generally to large data centers and enterprise networks, and, in particular, to methods and apparatus for providing services in a distributed switch within, for example, a single-layer data center.

Some known data centers arrange network devices in a way such that a typical three-layer architecture (e.g., an access layer, an aggregation layer and a core layer) can be collapsed into a single-layer architecture. In such single-layer architecture, multiple edge devices such as top of rack (TOR) network devices are interconnected by multiple links. The TOR network devices are connected to multiple server devices that provide various functions and services for components of the data center.

A need exists, however, for methods and apparatus that can efficiently provide the functions and services in data centers of the single-layer architecture.

SUMMARY

In some embodiments, a non-transitory processor-readable medium stores code representing instructions to be executed by a processor. The code causes the processor to receive, at an edge device, a first data unit having a characteristic. The code causes the processor to identify, at a first time, an identifier of a service module associated with the characteristic in response to each entry from a set of entries within a flow table not being associated with the characteristic. The code causes the processor to define an entry in the flow table associated with the characteristic and the identifier of the service module. The code causes the processor to send the first data unit to the service module. The code causes the processor to receive, at the edge device, a second data unit having the characteristic, and send the second data unit to the service module based on the entry.

BRIEF DESCRIPTION OF THE DRAWINGS

FIG. 6 is a schematic illustration of a flow table implemented at an edge device, according to an embodiment.

FIG. 7 is a schematic illustration of a flow table implemented at an edge device, according to another embodiment.

DETAILED DESCRIPTION

Figure 1:
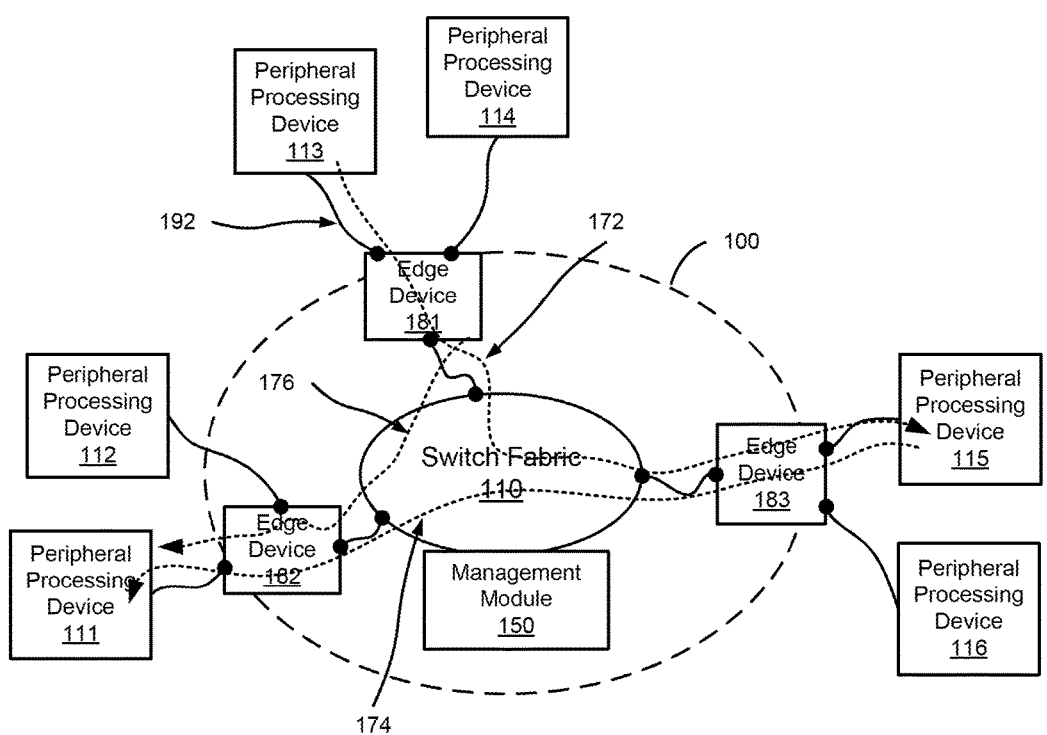
FIG. 1 is a schematic illustration of a switch fabric system configured to provide services to data traffic, according to an embodiment.

In some embodiments, a non-transitory processor-readable medium stores code representing instructions to be executed by a processor. The code stored in the non-transitory processor-readable medium includes code to cause the processor to receive, at an edge device, a first data unit (e.g., a data cell, a data packet, a header portion of the data packet, a payload portion of the data packet, etc.) having a characteristic. Such a characteristic can be, for example, an identifier of a source peripheral processing device, an identifier of a destination peripheral processing device, a type of the first data unit, or a protocol associated with the first data unit.

The non-transitory processor-readable medium includes code to cause the processor to identify, at a first time, an identifier of a service module associated with the characteristic in response to each entry from a set of entries within a flow table not being associated with the characteristic. In some embodiments, the code causes the processor to identify the identifier of the service module based on, for example, a hash function using the characteristic as an input. In some embodiments, the service module can provide, for example, a security service or a load balancing service to data units.

The non-transitory processor-readable medium includes code to cause the processor to define, at a second time after the first time, an entry in the flow table associated with the characteristic and the identifier of the service module in response to identifying the identifier of the service module. The non-transitory processor-readable medium also includes code to cause the processor to send the first data unit to the service module in response to identifying the identifier of the service module.

The non-transitory processor-readable medium further includes code to cause the processor to receive, at the edge device and after the second time, a second data unit having the characteristic, and then send the second data unit to the service module based on the entry. In some embodiments, the code causes the processor to send the second data unit to the service module based on the entry and without using, for example, the hash function. Additionally, in some embodiments, the non-transitory processor-readable medium includes code to cause the processor to remove the entry from the flow table in response to not receiving a third data unit having the characteristic within a predetermined time period after receiving the second data unit.

As used herein, the term "physical hop" can include a physical link between two modules and/or devices. For example, a data path operatively coupling a peripheral processing device with an edge device can be said to be a physical hop. Similarly stated, a physical hop can physically link the peripheral processing device with the edge device.

As used herein, the term "single physical hop" can include a direct physical connection between two devices in a system. Similarly stated, a single physical hop can include a link via which two devices are coupled without any intermediate module. Accordingly, for example, if a peripheral processing device is coupled to an edge device via a single physical hop, the peripheral processing device can send data packets directly to the edge device without sending the data packets through any intervening module.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric (e.g., a distributed switch fabric) can function as part of a single logical hop (e.g., a single large-scale consolidated L2/L3 switch). Portions of the switch fabric can be physically distributed across, for example, many chassis and/or modules interconnected by multiple physical hops. Such a switch fabric is a distributed switch fabric. In some embodiments, for example, a stage of the distributed switch fabric can be included in a first chassis and another stage of the distributed switch fabric can be included in a second chassis. Both of the stages can logically function as part of a single consolidated switch (e.g., within the same logical hop according to a first protocol) but include a separate single physical hop between respective pairs of stages within the consolidated switch. Similarly stated, a physical hop can operatively couple each stage within a distributed switch fabric representing a single logical hop associated with a protocol used to route data outside the distributed switch fabric. Additionally, packet classification and forwarding associated with a protocol used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a service module" is intended to mean a single service module or a combination of service modules.

FIG. 1 is a schematic illustration of a switch fabric system 100 configured to provide services to data traffic, according to an embodiment. The switch fabric system 100 includes a switch fabric 110, a management module 150 and multiple edge devices (e.g., edge devices 181-183). The switch fabric system 100 operatively couples multiple peripheral processing devices (e.g., peripheral processing devices 111-116) to each other. As shown in FIG. 1, each peripheral processing device 111-116 is operatively coupled to an edge device 181-183 of the switch fabric system 100. Specifically, the peripheral processing devices 111 and 112 are operatively coupled to the edge device 182; the peripheral processing devices 113 and 114 are operatively coupled to the edge device 181; the peripheral processing devices 115 and 116 are operatively coupled to the edge device 183.

Each peripheral processing device 111-116 can be any device that can send data to and/or receive data from the edge device 181-183 that is operatively coupled to that peripheral processing device 111-116. The peripheral processing devices 111-116 can be, for example, compute nodes, service nodes, routers, and storage nodes, etc. In some embodiments, for example, the peripheral processing devices 111-116 include servers, storage devices, gateways, workstations, and/or the like.

The peripheral processing devices 111-116 can be operatively coupled to the edge devices 181-183 of the switch fabric system 100 using any suitable connection such as, for example, an optical connection (e.g., an optical cable and optical connectors), an electrical connection (e.g., an electrical cable and electrical connectors), a wireless connection (e.g., a wireless transceiver), and/or the like. As such, the peripheral processing devices 111-116 can be configured to send data (e.g., data packets, data cells) to other peripheral processing devices 111-116 via the switch fabric system 100 including the edge devices 181-183 and the switch fabric 110. In some embodiments, each connection between a peripheral processing device 111-116 and an edge device 181-183 is a direct link (e.g., a wired link, a wireless link). Such a link can be said to be a single physical hop link. In other embodiments, each peripheral processing device 111-116 can be operatively coupled to an edge device 181-183 via intermediate module(s) (not shown in FIG. 1). Such a connection can be said to be a multiple physical hop link.

Each edge device 181, 182, 183 can be any device configured to operatively couple peripheral processing devices 111-116 to the switch fabric 110. In some embodiments, the edge devices 181-183 can be, for example, access switches, input/output modules, top-of-rack (TOR) devices and/or the like. Structurally, the edge devices 181-183 can function as both source edge devices and destination edge devices. Accordingly, the edge devices 181-183 can send data (e.g., a data stream of data packets or data cells) to and receive data from the switch fabric 110, and to and from the connected peripheral processing devices 111-116.

Each edge device 181, 182, 183 is configured to communicate with the other edge devices 181-183 via the switch fabric 110. Specifically, the switch fabric 110 is configured to provide any-to-any connectivity between the edge devices 181-183 at relatively low latency. That is, the switch fabric 110 can be configured to transmit (e.g., convey) data between the edge devices 181-183. In some embodiments, the switch fabric 110 can have at least hundreds or thousands of ports (e.g., egress ports and/or ingress ports) through which the edge devices 181-183 can transmit and/or receive data. In some embodiments, each edge device 181, 182, 183 can be configured to communicate with the other edge devices 181, 182, 183 over multiple data paths across the switch fabric 110. Similarly stated, in some embodiments, multiple data paths exist, within the switch fabric 110, between an edge device 181, 182 or 183 and another edge device 181, 182 or 183. In some embodiments, the switch fabric system 100 can have a single-layer architecture. In such a single-layer architecture, each edge device is configured to be connected to and communicate with each other edge device via a single physical hop. Similarly stated, each edge device is directly connected to each other edge device in the switch fabric system.

Figure 3:
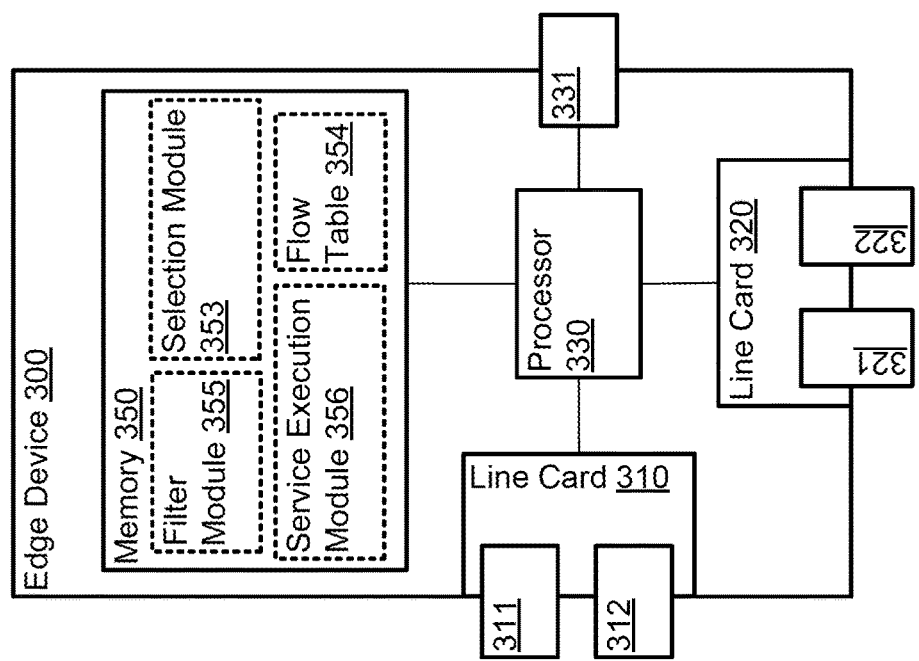
FIG. 3 is a block diagram of an edge device, according to an embodiment.

FIG. 3 is a block diagram of an edge device 300, according to an embodiment. The edge device 300 can be structurally and functionally similar to the edge devices 181-183 shown and described with respect to FIG. 1. Particularly, the edge device 300 can operatively couple one or more peripheral processing devices (not shown in FIG. 3, but similar to the peripheral processing devices 111-116 in FIG. 1) to a switch fabric (not shown in FIG. 3, but similar to the switch fabric 110 in FIG. 1).

As shown in FIG. 3, the edge device 300 includes a processor 330; a memory 350, which includes a filter module 355, a selection module 353, a service execution module 356, and a flow table 354; line cards 310, 320; and a port 331. The processor 330 is operatively coupled to the memory 350, the line card 310, the line card 320 and the port 331. The line card 310 includes ports 311 and 312. The line card 320 includes ports 321 and 322. In some embodiments, the line cards 310 and/or 320 can include one or more processors and/or memories. In some embodiments, a port can be any entity that can actively communicate with (e.g., send data to and/or receive data from) a coupled device or over a network. Such a port need not necessarily be a hardware port, but can be a virtual port or a port defined by software.

In some embodiments, the ports 311, 312, 321 and/or 322 can be coupled to and communicate with, for example, multiple peripheral processing devices coupled to the edge device 300. In such embodiments, the ports 311, 312, 321 and/or 322 can implement one or more physical layers (e.g., a physical layer using fiber-optic signaling, a physical layer using twisted-pair electrical signaling). Furthermore, the ports 311, 312, 321 and/or 322 can allow the edge device 300 to communicate with the multiple peripheral processing devices via one or more communication protocols (e.g., a Fibre Channel protocol, an Ethernet protocol). Thus, the edge device 300 can be in communication with the multiple peripheral processing devices using homogeneous or heterogeneous physical layers and/or communication protocols via the ports 311, 312, 321 and/or 322.

In some embodiments, the port 331 can be connected to a device (e.g., a switching device, a routing device) within the switch fabric, such that the edge device 300 can be operatively coupled to other edge devices via the switch fabric. The port 331 can be part of one or more network interfaces (e.g., a 40 Gigabit (Gb) Ethernet interface, a 100 Gb Ethernet interface, etc.) through which the edge device 300 can send data to and/or receive data from the switch fabric. The data can be sent to and/or received from the switch fabric via, for example, an optical link, an electrical link, or a wireless link operatively coupled to the edge device 300. In some embodiments, the edge device 300 can send data to and/or receive data from the switch fabric based on one or more communication protocols (e.g., a Fibre Channel protocol, an Ethernet protocol).

In some embodiments, the port 331 can implement a different physical layer and/or communication protocol than those implemented at the ports 311, 312, 321 and 322. For example, the port 311, 312, 321 and 322 can communicate with the peripheral processing devices using a communication protocol based on data packets and the port 331 can communicate with the switch fabric using a communication protocol based on data cells. In some embodiments, the edge device 300 can be an edge device of a network switch such as a distributed network switch.

In some embodiments, the memory 350 can be, for example, a random-access memory (RAM) (e.g., a dynamic RAM, a static RAM), a flash memory, a removable memory, and/or so forth. In some embodiments, the flow table 354 can be implemented as, for example, a relational database, a table, and/or so forth. In some embodiments, the flow table 354 can be stored in a location within the memory 350. In some embodiments, although not shown in FIG. 3, the edge device 300 can include one or more flow tables. Details of a flow table (e.g., the flow table 354) are further shown and described with respect to FIGS. 6 and 7.

In some embodiments, the filter module 355, the service selection module 353 and the service execution module 356 can be, for example, a process, application, virtual machine, and/or some other software module (stored and/or executing in hardware) or a hardware module. For example, instructions that implement the filter module 355, the selection module 353 and the service execution module 356 can be stored within the memory 350 and executed at the processor 330. The filter module 355 can be configured to identify desired service(s) and/or service module(s) to perform the desired service(s). The selection module 353 can be configured to select service module(s) to perform the desired service(s) based on a flow table (e.g., the flow table 354). The service execution module 356 can be configured to perform desired service(s) on data units at the edge device 300. Details of the functions associated with the filter module 355, the selection module 353 and the service execution module 356 are described below with respect to FIG. 1.

The edge device 300 can include, for example, a combination of hardware modules and software modules (stored and/or executing in hardware). In some embodiments, for example, the edge device 300 can include a field-programmable gate array (FPGA), an application specific integrated circuit (ASIC), a digital signal processor (DSP) and/or the like. In some embodiments, by executing the modules (e.g., the filter module 355, the selection module 353, the service execution module 356) included in the edge device 300 and using the flow table 354, the edge device 300 can be configured to route data traffic through the switch fabric such that one or more desired services can be performed on the data, or perform the desired service(s) on the data locally at the edge device 300, before the data is sent to the destination (e.g., a destination peripheral processing device). Specifically, the edge device 300 can be configured to identify one or more services to be performed on the data that is received at the edge device 300, select one or more service modules associated with the identified service(s), send the data to the selected service module(s) such that the selected service module(s) can perform the service(s) on the data, and/or perform the identified service(s) on the data at the edge device 300. Details of such a process are further described below with respect to FIGS. 1 and 8.

Figure 5:
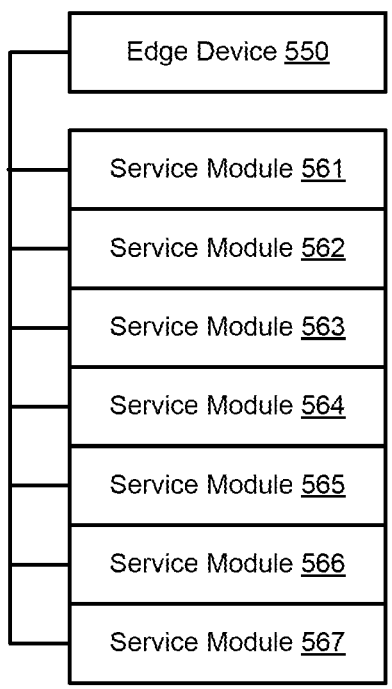
FIG. 5 is a schematic illustration of an edge device operatively coupled to a set of service modules, according to an embodiment.

In some embodiments, an edge device can be operatively coupled to or include one or more service modules. FIG. 5 is a schematic illustration of an edge device 550 operatively coupled to a rack of service modules 561-567, according to an embodiment. The edge device 550 can be structurally and functionally similar to the edge devices 181-183 shown and described with respect to FIG. 1. Particularly, the edge device 550 can be an edge device within a switch fabric system (similar to the switch fabric system 100 in FIG. 1). The edge device 550 can operatively couple a set of peripheral processing devices (not shown in FIG. 5, but similar to the peripheral processing devices 111-116 in FIG. 1) to a switch fabric (not shown in FIG. 5, but similar to the switch fabric 110 in FIG. 1). In some embodiments, for example, the edge device 550 can be a TOR network device such as a network switch, which is interconnected with the rack of service modules 561-567.

The service modules 561-567 can be any module, component or device configured to provide one or more functions and/or perform one or more services. For example, each service module 561-567 can be configured to provide a function(s) associated with transmitting data to and/or receiving data from other devices via the edge device 550 and the switch fabric, where the edge device 550 can be a source edge device and/or a destination edge device. For example, the service module 561 can be a web server configured to host a website and receive, via the edge device 550 and the switch fabric, data from an input device (e.g., a personal computer, a smart phone) operated by a user. For another example, the service module 562 can be an application server configured to execute an application and send, via the edge device 550 and the switch fabric, data to a display device associated with a user.

One or more service modules from the rack of service modules 561-567 can be configured to perform a service on data transmitted or to be transmitted across the switch fabric. For example, the service module 563 can be configured to perform a security service (e.g., firewall) on data transmitted or to be transmitted to a web server. For another example, the service module 564 can be configured to perform a load balancing service (e.g., a service to distribute data traffic over multiple data paths) on data generated from an application server. One or more service modules from the rack of service modules 561-567 can be a virtual service module. Such a virtual service module can be managed (e.g., instantiated, configured, monitored, maintained, moved, de-instantiated, etc.) by a management module (similar to the management module 150 in FIG. 1 and the management module 400 in FIG. 4) that is configured to manage the edge devices (including the edge device 550) and the virtual service module(s) of the switch fabric system. Details of managing virtual service modules are further described below with respect to FIG. 4.

One or more service modules 561-567 can be hosted and executed at, for example, a peripheral processing device from the set of peripheral processing devices operatively coupled to the edge device 550, and/or any other type of server device operatively coupled to the edge device 550. In such instances, the one or more service modules 561-567 are operatively coupled to the edge device 550 as shown in FIG. 5. A peripheral processing device hosting a service module can be referred to as a service peripheral processing device. Similarly, although not shown in FIG. 5, one or more service modules 561-567 can be hosted and executed within the edge device 550. In such instances, the one or more service modules 561-567 can be stored in a memory of the edge device 550 and executed at a processor of the edge device 550. An edge device hosting a service module can be referred to as a service edge device.

Returning to FIG. 1, the switch fabric 110 can be any suitable switch fabric that operatively couples the edge devices 181-183 to the other edge devices 181-183 via one or multiple data paths. For example, the switch fabric 110 can be a Clos network (e.g., a non-blocking Clos network, a strict sense non-blocking Clos network, a Benes network) having multiple stages of switch modules (e.g., integrated Ethernet switches). In some embodiments, for example, the switch fabric 110 can be similar to the switch fabric 200 that has three stages (as shown and described below with respect to FIG. 2). In other embodiments, the switch fabric 110 shown in FIG. 1 can include any number of stages. In such embodiments, for example, the switch fabric 110 can include five, seven or nine stages.

In some embodiments, the switch fabric 110 can be (e.g., can function as) a single consolidated switch (e.g., a single large-scale consolidated L2/L3 switch). Similarly stated, the switch fabric 110 can be configured to operate as a single logical entity (e.g., a single logical network element). In such embodiments, the switch fabric 110 can be part of a single logical hop between a first edge device 181, 182 or 183 and a second edge device 181, 182 or 183 (e.g., along with the data paths between the edge devices 181-183 and the switch fabric 110). The switch fabric 110 can be configured to connect (e.g., operatively couple, facilitate communication between) the peripheral processing devices 111-116. In some embodiments, the switch fabric 110 can be configured to communicate via interface devices (not shown in FIG. 1) that are configured to transmit data at a rate of at least 10 Gb/s. In some embodiments, the switch fabric 110 can be configured to communicate via interface devices (e.g., fibre-channel interface devices) that are configured to transmit data at a rate of, for example, 2 Gb/s, 4 Gb/s, 8 Gb/s, 10 Gb/s, 40 Gb/s, 100 Gb/s and/or faster link speeds.

Although the switch fabric 110 can be logically centralized, the implementation of the switch fabric 110 can be highly distributed, for example, for reliability. For example, portions of the switch fabric 110 can be physically distributed across, for example, many chassis (or racks). In some embodiments, for example, a stage of the switch fabric 110 can be included in a first chassis and another stage of the switch fabric 110 can be included in a second chassis. Both of the stages can logically function as part of a single consolidated switch (e.g., within the same logical hop) but have a separate single physical hop between respective pairs of stages.

Figure 2:
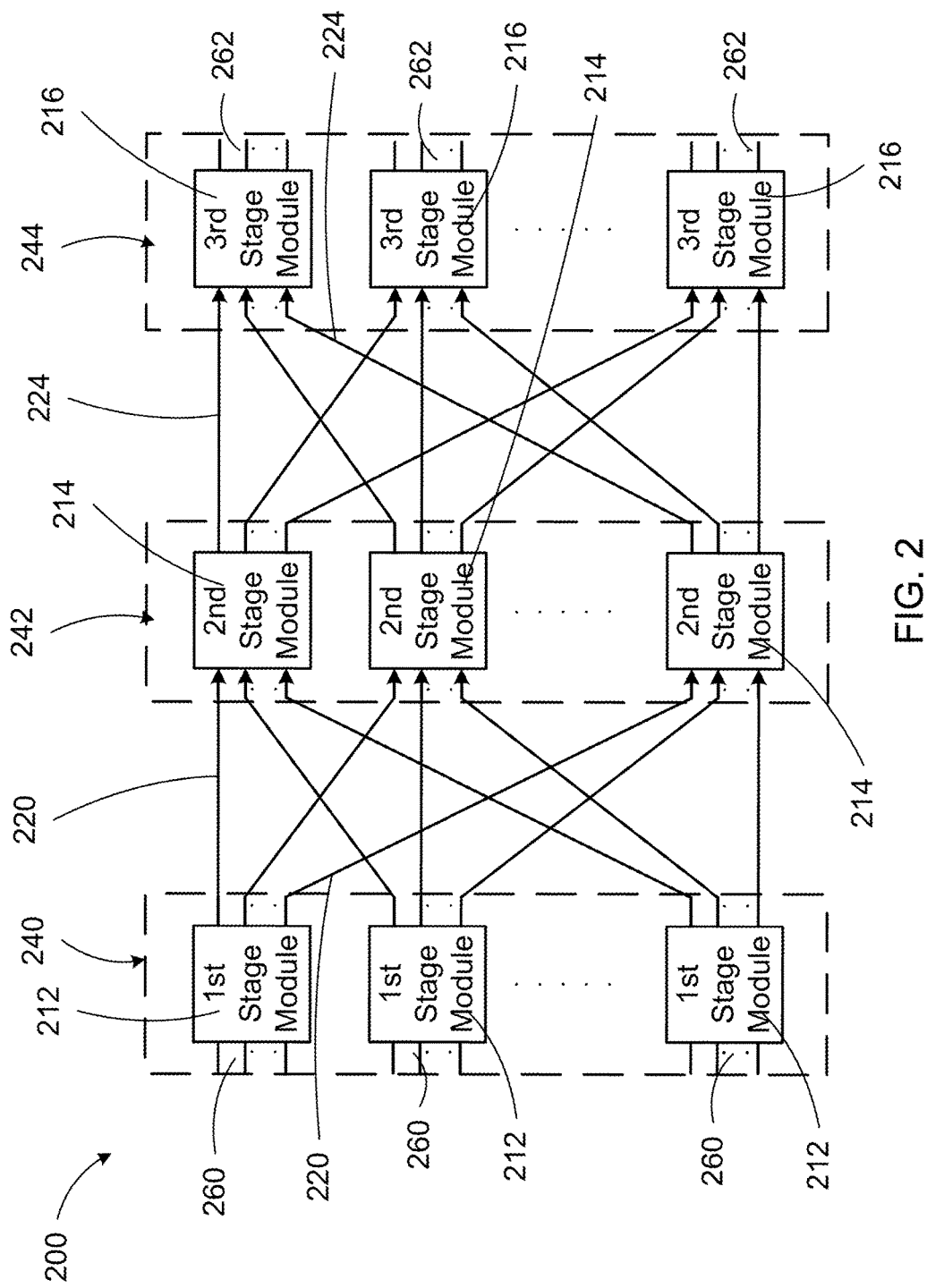
FIG. 2 is a schematic illustration of a multi-stage switch fabric, according to an embodiment.

FIG. 2 is a schematic illustration of a multi-stage switch fabric 200, according to an embodiment. The switch fabric 200 can be structurally and functionally similar to the switch fabric 110 shown and described with respect to FIG. 1. The switch fabric 200 can include multiple physical hops that are within a single logical hop. In some embodiments, the switch fabric 200 can be a multi-stage, non-blocking Clos network that includes a first stage 240, a second stage 242, and a third stage 244. The first stage 240 includes switch modules 212; the second stage 242 includes switch modules 214; the third stage 244 includes switch modules 216. Said another way, switch modules 212 of the first stage 240, switch modules 214 of the second stage 242 and switch modules 216 of the third stage 244 collectively define the multi-stage switch fabric 200.

In some embodiments, each switch module 212 of the first stage 240 can be an assembly of electronic components and circuitry. In some embodiments, for example, each switch module 212 is an ASIC. In other embodiments, multiple switch modules are contained on a single ASIC or a single chip package. In still other embodiments, each switch module is an assembly of discrete electrical components.

In some embodiments, each switch module 212 of the first stage 240 is a switch (e.g., a packet switch, a frame switch, an integrated Ethernet switch and/or a cell switch). The switches are configured to redirect data (e.g., data packets, data cells, etc.) as it flows through the switch fabric 200. In some embodiments, for example, each switch includes multiple ingress ports operatively coupled to write interfaces on a memory buffer (not shown in FIG. 2). Similarly, a set of egress ports are operatively coupled to read interfaces on the memory buffer. In some embodiments, the memory buffer can be a shared memory buffer implemented using on-chip static random access memory (SRAM) to provide sufficient bandwidth for all ingress ports to write one incoming data cell (e.g., a portion of a data packet) or data packet per time period (e.g., one or more clock cycles) and for all egress ports to read one outgoing data cell or data packet per time period. Each switch operates similarly to a crossbar switch that can be reconfigured in subsequent each time period.

Each switch module 212 of the first stage 240 includes a set of ingress ports 260 configured to receive data (e.g., a data cell, a data packet) as it enters the switch fabric 200. For example, each ingress port 260 can be coupled to an edge device (e.g., the edge devices 181-183 shown and described with respect to FIG. 1). In some embodiments, more than one ingress port 260 of a switch module 212 can be coupled to different ports of a common edge device via separate physical connections (e.g., multiple electrical cables, multiple fiber-optic cables, etc.). Accordingly, an edge device can send data to the switch fabric 200 via the ingress ports 260. In the embodiment of FIG. 2, each switch module 212 of the first stage 240 includes the same number of ingress ports 260. In other embodiments, each switch module 212 can have different numbers of ingress ports 260.

Similar to the first stage 240, the second stage 242 of the switch fabric 200 includes switch modules 214. The switch modules 214 of the second stage 242 are structurally similar to the switch modules 212 of the first stage 240. In some embodiments, each switch module 214 of the second stage 242 is operatively coupled to each switch module 212 of the first stage 240 by a data path 220. Each data path 220 between a given switch module 212 of the first stage 240 and a given switch module 214 of the second stage 242 is configured to facilitate data transfer from the switch modules 212 of the first stage 240 to the switch modules 214 of the second stage 242.

The data paths 220 between the switch modules 212 of the first stage 240 and the switch modules 214 of the second stage 242 can be constructed in any manner configured to facilitate data transfer from the switch modules 212 of the first stage 240 to the switch modules 214 of the second stage 242. In some embodiments, for example, the data paths 220 can be, for example, optical connectors between the switch modules. In other embodiments, the data paths 220 can be within a midplane. Such a midplane can be used to connect each switch module 214 of the second stage 242 with each switch module 212 of the first stage 240. In still other embodiments, two or more switch modules 212 and 214 can be contained within a single chip package and the data paths 220 can be electrical traces.

In some embodiments, the switch fabric 200 can be a non-blocking Clos network. Thus, the number of switch modules 214 of the second stage 242 of the switch fabric 200 varies based on the number of ingress ports 260 of each switch module 212 of the first stage 240. In a rearrangeably non-blocking Clos network (e.g., a Benes network), the number of switch modules 214 of the second stage 242 is greater than or equal to the number of ingress ports 260 of each switch module 212 of the first stage 240. In some embodiments, for example, each switch module 212 of the first stage 240 has five ingress ports. Thus, the second stage 242 has at least five switch modules 214. Each of the switch modules 212 of the first stage 240 is operatively coupled to all the switch modules 214 of the second stage 242 by data paths 220. Said another way, each switch module 212 of the first stage 240 can send data to any switch module 214 of the second stage 242.

The third stage 244 of the switch fabric 200 includes switch modules 216. The switch modules 216 of the third stage 244 are structurally similar to the switch modules 212 of the first stage 240. The number of switch modules 216 of the third stage 244 is typically equivalent to the number of switch modules 212 of the first stage 240. Each switch module 216 of the third stage 244 includes egress ports 262 configured to allow data to exit the switch fabric 200. For example, each egress port 262 can be coupled to an edge device (e.g., the edge devices 181-183 shown and described with respect to FIG. 1). In some embodiments, similar to the switch module 212 of the first stage 240, more than one egress port 262 of a switch module 216 can be coupled to different ports of a common edge device via separate physical connections (e.g., multiple electrical cables, multiple fiber-optic cables, etc.). Accordingly, the edge device can receive data from the switch fabric 200 via the egress ports 262. In the embodiment of FIG. 2, each switch module 216 of the third stage 244 includes the same number of egress ports 262. Further, the number of egress ports 262 of each switch module 216 of the third stage 244 is typically equivalent to the number of ingress ports 260 of each switch module 212 of the first stage 240. In other embodiments, each switch module 216 can have different numbers of egress ports 262, and the number of egress ports 262 of a switch module 216 of the third stage 244 can be different from the number of ingress ports 260 of a switch module 212 of the first stage 240.

In some embodiments, each switch module 216 of the third stage 244 can be connected to each switch module 214 of the second stage 242 by a data path 224. The data paths 224 between the switch modules 214 of the second stage 242 and the switch modules 216 of the third stage 244 are configured to facilitate data transfer from the switch modules 214 of the second stage 242 to the switch modules 216 of the third stage 244.

Similar to the data paths 220, the data paths 224 between the switch modules 214 of the second stage 242 and the switch modules 216 of the third stage 244 can be constructed in any manner configured to facilitate data transfer from the switch modules 214 of the second stage 242 to the switch modules 216 of the third stage 244. In some embodiments, for example, the data paths 224 can be, for example, optical connectors between the switch modules. In other embodiments, the data paths 224 can be within a midplane. Such a midplane can be used to connect each switch module 214 of the second stage 242 with each switch module 216 of the third stage 244. In still other embodiments, two or more switch modules 214 and 216 can be contained within a single chip package and the data paths 224 can be electrical traces.

In some embodiments, data can be routed through the switch fabric 200 using hash functions, lookup tables, routing tables and/or the like. For example, a first stage switch module 212 can determine to which second stage switch module 214 to send a data cell by using header values of the data cell as inputs to a hash function. A result of the hash function can be an identifier of a second stage switch module 214 and the first stage switch module 212 can send the data cell accordingly. Similarly, a second stage switch module 214 and/or a third stage switch module 216 can determine to which third stage switch module 216 or to which edge device (coupled to an egress port 262), respectively, to send the data cell, respectively, using such a hash function, a lookup table and/or a routing table.

Returning to FIG. 1, the management module 150 can be, for example, a process, application, virtual machine, and/or some other software module (store and/or executing in hardware) or a hardware module hosted at a device within the switch fabric system 100. In some embodiments, the management module 150 can be hosted at, for example, an edge device (e.g., the edge device 181-183), a switching device in the switch fabric 110, or any other suitable device in the switch fabric system 100. The device hosting the management module 150 is operatively coupled to the remaining devices of the switch fabric system 100, including the edge devices 181-183. For example, instructions that implement the management module 150 can be stored at a memory within an edge device (e.g., the edge devices 181-183) and executed at a processor of that edge device.

The management module 150 can be configured to manage one or more edge devices (e.g., the edge devices 181-183) of the switch fabric system 100. For example, the management module 150 can manage and/or maintain configuration information (e.g., port protocol information, network segment assignment information, port assignment information, peripheral processing device information, etc.), forwarding-state information (e.g., port identifiers, network segment identifiers, peripheral processing device identifiers, etc.), and/or other information associated with the edge devices 181-183. The management module 150 can also, for example, monitor a state and/or status of the peripheral processing devices (e.g., the peripheral processing devices 111-116) associated with the edge devices 181-183, and/or manage and maintain other information associated with the peripheral processing devices and/or ports associated with the edge devices 181-183. Particularly, the management module 150 can be configured to manage and maintain information associated with performing service(s) to data transmitted or to be transmitted across the switch fabric system 100. More detail on managing and maintaining information at a management module is discussed below with respect to the virtual machine (VM) orchestration module 453 and the provisioning module 454 of the management module 400 in FIG. 4.

Figure 4:
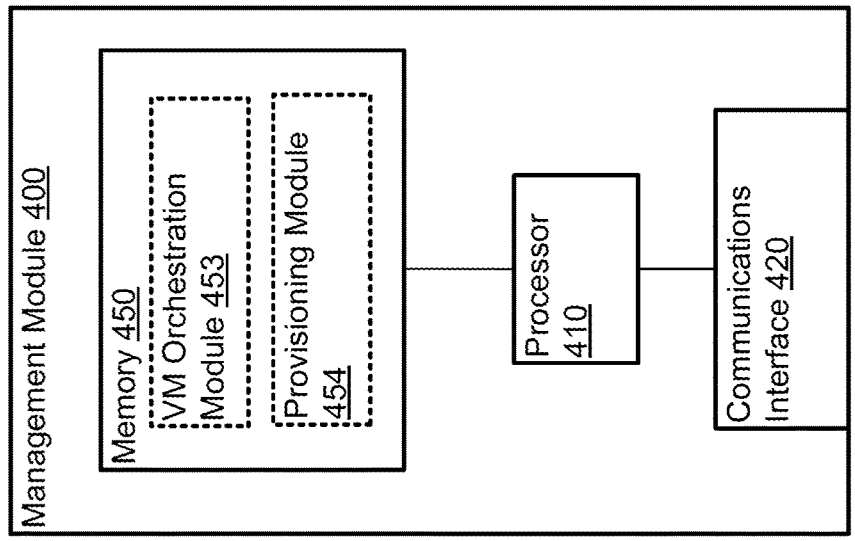
FIG. 4 is a block diagram of a management module, according to an embodiment.

FIG. 4 is a block diagram of a management module 400, according to an embodiment. The management module 400 can be structurally and functionally similar to the management module 150 shown and described with respect to FIG. 1. Particularly, the management module 400 can be hosted at a device (e.g., an edge device, a switching device) of a switch fabric system similar to the switch fabric system 100 in FIG. 1. The management module 400 can be operatively coupled to the remaining devices (e.g., edge devices) of the switch fabric system. In some embodiments, the management module 400 can be configured to manage operations of a set of edge devices in the switch fabric system.

As shown in FIG. 4, the management module 400 includes a memory 450, which includes a VM orchestration module 453 and a provisioning module 454; a processor 410; and a communications interface 420. The memory 450 can be, for example, a RAM (e.g., a dynamic RAM, a static RAM), a flash memory and/or a removable memory. Each of the modules included in the memory 450 (include possible modules not shown in FIG. 4) can be, for example, a database, process, application, virtual machine, and/or some other software module (stored and/or executing in hardware) or a hardware module executed at the management module 400. For example, instructions that implement the modules can be stored in the memory 450 and executed by the processor 410. The processor 410 can be any processor configured to, for example, write data into and read data from the memory 450, and execute the instructions stored within the memory 450. The processor 410 can also be configured to control, for example, the operations of the VM orchestration module 453, the provisioning module 454, and the communications interface 420. Furthermore, by executing the instructions stored in the memory 450, the management module 400 can be configured to communicate with (e.g., transmit signals to and/or receive signals from) the devices (e.g., edge devices) managed by the management module 400 via the communications interface 420.

Under the control of the processor 410 and based on the instructions stored in the memory 450, the management module 400 can also, for example, manage operations of the set of edge devices in the switch fabric system. Particularly, the VM orchestration module 453, the provisioning module 454, and/or other modules (not shown in FIG. 4) of the management module 400 can be configured to collectively mange operations of the edge devices associated with performing service(s) on data transmitted or to be transmitted across the switch fabric system.

The VM orchestration module 453 can be configured to manage (e.g., instantiate, configure, monitor, maintain, move, de-instantiate, etc.) virtual service modules executed at devices (e.g., service edge devices, service peripheral processing devices) in the switch fabric system. The virtual service modules managed by the VM orchestration module 453 can be executed to perform various services (e.g., security services, load balancing services) on data transmitted or to be transmitted across the switch fabric system. For example, the VM orchestration module 453 can be configured to send a signal (e.g., via the communications interface 420) to an edge device such that a virtual service module to perform a firewall service is instantiated at that edge device. For another example, the VM orchestration module 453 can be configured to monitor a status of a virtual service module executed at a service peripheral processing device such that the VM orchestration module 453 can receive an indication (e.g., via the communications interface 420) from that service peripheral processing device indicating a change of status of that virtual service module (e.g., the virtual service module is overloaded).

The provisioning module 454 can be configured to maintain information associated with service modules that are available to perform service(s) and/or service modules that are actively performing service(s) on data transmitted or to be transmitted across the switch fabric system. For example, the provisioning module 454 can be configured to maintain a data structure (e.g., a list, a table) storing information of available service(s) and location(s) of the associated service module(s) that performs the service(s). In some instances, the provisioning module 454 can be configured to send a copy of the data structure or a portion of the data structure to each edge device, such that the edge device can select an appropriate service module based on the data structure. Furthermore, after a status of a service module is changed (e.g., activated, inactivated, overloaded, etc.), the provisioning module 454 can be configured to receive an indication of the change, update the information of that service module accordingly, and then send the updated information (e.g., an updated version of data structure or portion of the data structure) to each edge device. Thus, each edge device can be updated with any change of any service module in the switch fabric system.

In some embodiments, as further described below, an edge device managed by the management module 400 can be configured to start performing a service in response to receiving an indication from a service module that performs that service. In such embodiments, the edge device can send a signal to the management module 400, indicating that the service is available at the edge device. In response to the signal, the provisioning module 454 can be configured to store information associated with the edge device performing the service within the data structure. In some embodiments, the provisioning module 454 can be configured to send the updated information (e.g., an updated version of data structure or portion of the data structure) associated with the edge device to other devices (e.g., edge devices, peripheral processing devices) of the switch fabric system.

Returning to FIG. 1, the switch fabric system 100 can be configured to forward data units (e.g., data packets, data cells, a portion of a data packet, a portion of a data cell, a header portion of the data packet, a payload portion of the data packet, etc.) generated from a source peripheral processing device to a destination peripheral processing device via an edge device coupled to the source peripheral processing device (e.g., a source edge device), the switch fabric 110, an edge device coupled to the destination peripheral processing device (e.g., a destination edge device), and/or one or more other devices (e.g., service edge devices, service peripheral processing devices) performing service(s) to the data. Thus, the switch fabric system 100 can be configured to perform one or more services to the data before the data is sent to the destination peripheral processing device.

For example, as shown in FIG. 1, the switch fabric system 100 can be configured to forward data generated from the peripheral processing device 113 (the source peripheral processing device) to the peripheral processing device 111 (the destination peripheral processing device) via the edge device 181 (the source edge device, and a service edge device in some scenarios), the switch fabric 110, the edge device 182 (the destination edge device), and/or the edge device 183 and the peripheral processing device 115 (function as a service edge device or a service peripheral processing device in some scenarios). Thus, one or more services can be performed on the data before the data is sent to the peripheral processing device 111. In some scenarios, for example, the data is sent from the peripheral processing device 113 to the peripheral processing device 111 via the data path 172 and the data path 174, as shown in FIG. 1.

Specifically, the edge device 181 can be configured to receive, for example, a data stream of data units (e.g., data packets, data cells, a portion of a data packet, a portion of a data cell, a header portion of the data packet, a payload portion of the data packet, etc.) from the peripheral processing device 113 via the data path 192. The data stream can be associated with, for example, a first server (e.g., a web server) executed at the peripheral processing device 113 and a second server (e.g., an application server) executed at the peripheral processing device 111. As a result, the data stream can be generated at the first server at the peripheral processing device 113 and destined to the second server at the peripheral processing device 111.

Each data unit of the data stream includes at least one characteristic associated with the data stream. Such a characteristic can be, for example, an identifier of the source peripheral processing device 113 (e.g., an Internet Protocol (IP) address or a medium access control (MAC) address of the peripheral processing device 113), an identifier of the destination peripheral processing device 111 (e.g., an IP address or a MAC address of the peripheral processing device 111), an identifier of a service port (e.g., a port of the peripheral processing device 113 that is associated with the first server), an identifier of a destination port (e.g., a port of the peripheral processing device 111 that is associated with the second server), information associated with a transfer protocol, a type (e.g., data packets, data cells) of the data units included in the data stream, any other suitable characteristic, or a combination of any of the above characteristics. An indication of the characteristic of each data unit can be included in, for example, a header portion of that data unit.

In response to receiving a data unit from the data stream, the edge device 181 can be configured to identify one or more desired services to be performed on the data unit and one or more service modules to perform the desired service(s) based on the characteristic and/or other information included in the data unit. In some embodiments, the edge device 181 can identify the desired service(s) and service module(s) to perform the desired service(s) based on a flow table (e.g., the flow table 354 of the edge device 300 in FIG. 3). Such a flow table stores and maintains associations of characteristics of data units and service modules and/or other related information.

FIG. 6 is a schematic illustration of a flow table 600 implemented at a source edge device, according to an embodiment. The source edge device can be similar to the edge devices 181-183 in FIG. 1 and the edge device 300 in FIG. 3. The flow table 600 can be implemented in a memory of the source edge device similar to the flow table 354 implemented in the memory 350 of the edge device 300 in FIG. 3. The source edge device can be included in a switch fabric system (e.g., the switch fabric system 100 in FIG. 1), and thus operatively coupled to other devices (e.g., other edge devices, peripheral processing devices) associated with the switch fabric system. As shown in FIG. 6, the flow table 600 includes three columns: service module identifier (ID) 610, counter 620, and characteristic identifier (ID) 630. As described in further details herein, values and/or associations stored in the flow table 600 can be changed (e.g., inserted, modified, updated, removed, etc.) automatically (e.g., triggered by transmission of data units) or manually (e.g., by an operator or administrator of the switch fabric system).

The first column, service module ID 610, stores identifiers (e.g., 1, 2, 7, $SM_N$) of service modules that perform one or more services on data units. Each identifier of a service module uniquely identifies that service module. For example, the service module identifier 1 identifies a service module that is hosted and executed at an edge device and performs a firewall service on data units; the service module identifier 2 identifies a service module that is hosted and executed at a peripheral processing device and performs a load balancing service on data units.

Each entry of the second column, counter 620, stores a value (e.g., 25, 72, 5, $C_M$) associated with the usage of the service module that is identified by the service module identifier stored in the same entry (or line) with that value in the flow table 600. In some embodiments, the value can represent, for example, an accumulated number of data units that have been sent to the service module for service during a specific period of time. The specific period of time can be a system parameter that can be predetermined and/or configured by, for example, an operator or administrator of the switch fabric system. For example, the value 25 associated with the service module identifier 1 indicates that 25 data units have been sent from the source edge device to the service module identified by the service module identifier 1 (e.g., the service module to perform the firewall service) within the last 10 milliseconds. For another example, the value 72 associated with the service module identifier 2 indicates that 72 data units have been sent from the source edge device to the service module identified by the service module identifier 2 (e.g., the service module to perform the load balancing service) within the last 10 milliseconds.

In some other embodiments, the value can be, for example, a rate associated with transmitting data units of one or more data streams from the source edge device to the service module identified by the service module identifier. For example, the value 5/msec indicates that the source edge device has been sending data units to the service module identified by the service module identifier 7 at a rate of 5 data units per millisecond. Furthermore, in some embodiments, the rate can be calculated periodically and updated accordingly.

In some embodiments, the values stored in the counter 620 can be updated in any suitable method. For example, an accumulated number associated with a service module can be decremented by 1 after the source edge device does not send any data unit to that service module in a predetermined period of time. For another example, a rate associated with a service module can be manually changed to any arbitrary value (e.g., 0) by an operator or administrator of the switch fabric system. In some embodiments, an entire entry of the flow table 600 associated with a data stream (including a service module identifier, a counter value and a characteristic identifier) can be removed from the flow table 600 in response to the source edge device not receiving any data unit from that data stream within a predetermined time period.

Each entry of the third column, characteristic ID 630, stores an identifier (e.g., 10, 37, 5, 21, 17, 54, $CID_T$) of a characteristic included in each data unit of a data stream. Each characteristic identifier uniquely identifies that characteristic. For example, the characteristic identifier 10 identifies an identifier (e.g., an address) of a source peripheral processing device for a data stream; the characteristic identifier 37 identifies an identifier (e.g., an address) of a destination peripheral processing device for a data stream; the characteristic identifier 54 identifies a transfer protocol used for transmitting data units of a data stream; the characteristic identifier 17 identifies a type for data units of a data stream.

According to the flow table 600, data units including the characteristic identified by a characteristic identifier stored in an entry of the characteristic ID 630 are sent to the service module identified by the service module identifier stored in the entry of the service module ID 610 that corresponds to that entry of the characteristic ID 630. Sending of such data units is also recorded by updating the value stored in the entry of the counter 620 that is associated with the entry of the characteristic ID 630 and the entry of the service module ID 610. For example, data units from a data stream including the characteristic identified by the characteristic identifier 10 (e.g., a common source peripheral processing device) are sent to the service module identified by the service module identifier 1 (in service module ID 610), and the accumulated number (shown as 25 in FIG. 6) stored in the associated entry of the counter 620 is incremented by 1 after each data unit from the data stream is sent to that service module. For another example, data units from a data stream including the characteristic identified by the characteristic identifier 54 (e.g., a specific transfer protocol) are sent to the service module identified by the service module identifier 7 (in service module ID 610), and the rate (shown as 5/msec in FIG. 6) stored in the associated entry of the counter 620 is updated accordingly (e.g., after each data unit from the data stream is sent to that service module, after each certain period of time, etc.).

Although shown in the flow table 600 as each service module being associated with one counter (e.g., an accumulated number, a rate), in some other embodiments, each service module can be associated with more than one counter. For example, a service module can be associated with a first counter recording an accumulated number of data units sent from the source edge device to that service module, and a second counter recording a rate associated with transmitting data units from the source edge device to that service module. For another example, a service module can be associated with multiple counters, each of which records an accumulated number or a rate associated with data units of a different data stream that are sent from the source edge device to that service module. Although not shown in FIG. 6, in some embodiments, the service module identified by the service module identifier 2 (in service module ID 610) can be associated with three counters, each of which records an accumulated number or a rate associated with one of the three data streams that includes a characteristic identified by the characteristic identifier 5, 21 or 17.

Although not shown in FIG. 6, in some embodiments, a flow table can include information associated with services to be performed on data units and/or other information associated with the service modules. For example, a flow table can include a column of service ID that stores identifiers of services to be performed on data units transmitted or to be transmitted across the switch fabric system. Such a flow table can associate data units (identified by the characteristic identifiers), services to be performed on the data units (identified by the service identifiers), service modules that perform the services (identified by the service module identifiers), and counters for the service modules.

Returning to FIG. 1, in response to receiving a data unit from the data stream, the edge device 181 can check the flow table (similar to the flow table 600 described above with respect to FIG. 6) to determine if information of that data unit (or equivalently in some embodiments, information of that data stream) is stored in the flow table. Specifically, the edge device 181 can be configured to compare the characteristic(s) included in the data unit with the characteristics stored in the flow table. If one or more characteristics included in the data unit are identified as being stored in the flow table (e.g., identified by one or more characteristic identifiers stored in the flow table), then at least one data unit of that data stream has been previously received at and processed by the source edge device, and the information associated with performing service(s) on data units of the data stream is stored in the flow table. As a result, one or more service modules can be identified to perform desired service(s) on the data unit. In some embodiments, for example, a selection module of the edge device 181 (similar to the selection module 353 of the edge device 300 in FIG. 3) can be configured to identify the service module(s) to perform desired service(s) on the data unit based on the one or more entries of the flow table that include the characteristic(s) of the data unit. In such embodiments, the edge device 181 does not need to identify desired service(s) to be performed on the data unit and/or service module(s) to perform the desired service(s).

For example, as shown in FIG. 6, in response to receiving a data unit including an identifier of a source peripheral processing device identified by the characteristic identifier 10, the source edge device hosting the flow table 600 can be configured to identify the service module identifier 1 that is associated with the characteristic identifier 10 based on the flow table 600. As a result, the service module identified by the service module identifier 1 can be identified as a service module to perform a desired service on the data unit. Accordingly, the source edge device can be configured to send the data unit to the service module identified by the service module identifier 1, and increment by 1 the accumulated number (shown as 25 in FIG. 6) stored in the associated entry of the counter 620.

For another example, as shown in FIG. 6, in response to receiving a data unit based on a transfer protocol identified by the characteristic identifier 54, the source edge device hosting the flow table 600 can be configured to identify the service module identifier 7 that is associated with the characteristic identifier 54 based on the flow table 600. As a result, the service module identified by the service module identifier 7 can be identified as a service module to perform a desired service on the data unit. Accordingly, the source edge device can be configured to send the data unit to the service module identified by the service module identifier 7, and update the rate (shown as 5/msec in FIG. 6) stored in the associated entry of the counter 620 at an appropriate time.

Otherwise, if no characteristic of the data unit is identified as being stored in the flow table (e.g., not identified by any characteristic identifier stored in the flow table), then no information associated with performing service(s) on the data unit (or equivalently in some embodiments, on data units from the data stream) is stored in the flow table. In that case, the edge device 181 can be configured to identify desired service(s) and service module(s) to perform the desired service(s) using another method such as, for example, a hash function. Specifically, a filter module (similar to the filter module 355 of the edge device 300 in FIG. 3) and a selection module (similar to the selection module 353 of the edge device 300 in FIG. 3) of the edge device 181 can be configured to collectively identify the desired service(s) and the service module(s) to perform the desired service(s) based on the hash function. For example, one or more characteristics (e.g., an identifier of the source peripheral processing device 113, an identifier of the destination peripheral processing device 111, a type of the data unit, a transfer protocol used to transmit the data unit, etc.) included in the data unit can be used as inputs to the hash function, and the result of the hash function can be used to identify the desired service(s) and/or the service module(s) to perform the desired service(s). Details of identifying a desired service and a service module to perform the desired service using a hash function are described in co-pending U.S. patent application Ser. No. 13/538,344, filed on the same date, and entitled "Methods and Apparatus for Providing Services in a Distributed Switch," which is incorporated herein by reference in its entirety.

In response to a desired service to be performed on the data unit and a service module to perform the desired service being identified at the edge device 181, the edge device 181 can be configured to store information associated with the identified service module and/or the identified service in the flow table. For example, the edge device 181 can be configured to define an entry in the flow table, which includes an service module identifier that identifies the service module to perform the desired service on the data unit, a characteristic identifier that identifies a characteristic included in the data unit, a counter value (e.g., an accumulated number, a rate) associated with the identified service module, a service identifier that identifies the desired service, and/or any other suitable information associated with the service module. Particularly, the characteristic identifier stored in the entry of the flow table is associated with the characteristic that is used to identify the desired service and/or the service module to perform the desired service on the data unit. For example, the characteristic identifier stored in the entry of the flow table is associated with the characteristic that is used as an input to the hash function if the hash function were to be used to identify the desired service and/or the service module to perform the desired service for the data unit. Thus, subsequent data units of the data stream can be sent to the same service module as the first data unit of the data stream based on the newly-defined entry of the flow table.

In the example of FIG. 1, the edge device 181 receives a first data unit of the data stream from the source peripheral processing device 113. In response to not identifying a characteristic included in the first data unit within the flow table, the edge device 181 is configured to identify, by using a hash function, a service module hosted at the peripheral processing device 115 to perform a desired service on the first data unit. As a result, the edge device 181 is configured to send the first data unit to the peripheral processing device 115 via the data path 172. The service module performs the desired service on the first data unit at the peripheral processing device 115, and then sends the first data unit to the destination peripheral processing device 111 via the data path 174. Meanwhile, the edge device 181 is configured to define an entry in the flow table to store information associated with performing the desired service on data units of the data stream, including an identifier of the service module hosted at the peripheral processing device 115, an identifier of the characteristic included in the data units of the data stream (including the first data unit), a counter value, and/or the like. Furthermore, in response to sending the first data unit and each subsequent data unit of the data stream to the service module, the edge device 181 is configured to update the counter value associated with the service module accordingly (e.g., increment an accumulated number, recalculate a rate).

In some embodiments, at some time after sending the first data unit, the edge device 181 is configured to receive a second data unit of a data stream from a source peripheral processing device. The second data unit includes the same characteristic as the first data unit, which is stored in the entry of the flow table as described above. In some instances, the second data unit can be received from the same source peripheral processing device as that for the first data unit (i.e., the peripheral processing device 113). In such instances, the second data unit can be from the same data stream that includes the first data unit. In other instances, the second data unit can be received from a source peripheral processing device different from that for the first data unit (e.g., the peripheral processing device 114). In such instances, the second data unit is from a data stream different than the data stream that includes the first data unit.

Based on the entry of the flow table, the edge device 181 is configured to identify the service module hosted at the peripheral processing device 115 that can perform the desired service on the second data unit. In some embodiments, the edge device 181 can be configured to determine whether to send the second data unit to the identified service module or not based on information included in the entry of the flow table. Specifically, the selection module of the edge device 181 (similar to the selection module 353 of the edge device 300 in FIG. 3) can be configured to compare the counter value stored in the entry with a predetermined threshold. Such a predetermined threshold represents a maximum capacity that the identified service module can provide for performing the desired service to data units. In some embodiments, the predetermined threshold can be determined based on information associated with the source edge device, the service module, the link connecting the source device and the service module, and/or any other related information. The predetermined threshold can be configured, define or set by, for example, an operator or an administrator of the switch fabric system.

If the counter value stored in the entry is less than the predetermined threshold, then the identified service module is not yet overloaded with data units that are to be served at the identified service module. For example, the counter value that records an accumulated number of data units sent to the service module during a specific period of time is 25, which is less than a threshold 30 associated with the service module. As a result, the edge device 181 can be configured to send the second data unit to the peripheral processing device 115 via the data path 172, which performs the desired service on the second data unit and then sends the second data unit to a destination peripheral processing device associated with the second data unit (e.g., the peripheral processing device 111).

Otherwise, if the counter value stored in the entry is equal to or larger than the predetermined threshold, then the identified service module is already overloaded with data units that need to be served at the identified service module. For example, the counter value that records a rate associated with transmitting data units to the service module is 5/msec, which is greater than a threshold 4/msec associated with the service module. As a result, the selection module of the edge device 181 can be configured to identify or select a second service module, which is different from the service module used to perform the desired service on the first data unit, to perform the desired service on the second data unit. The second service module can be identified or selected using any suitable method. In some embodiments, for example, the edge device 181 can be configured to identify the second service module using the hash function as described above. In some other embodiments, for example, the edge device 181 can be configured to select the second service module from a set of service modules, whose information is stored at the edge device 181 (e.g. in the flow table or another memory location within the edge device 181). Thus, the selection module of the edge device 181 can be configured to load balance data units (including the first data unit and the second data unit) among the set of service modules that can perform the desired service on data units (including the service module that performs the service on the first data unit and the second service module that performs the service on the second data unit) based on the entry in the flow table.

For example, the edge device 181 can be configured to select a service module hosted at the peripheral processing device 116 to perform the desired service on the second data unit. Accordingly, the edge device 181 can be configured to send the second data unit to the peripheral processing device 116, which performs the desired service on the second data unit and then sends the second data unit to a destination peripheral processing device associated with the second data unit (e.g., the peripheral processing device 111).

Similar to the scenario of the first data unit described above, in response to sending the second data unit to the second service module, the edge device 181 is configured to define an entry associated with the second service module in the flow table (if that entry is not yet stored in the flow table), or update the entry associated with the second service module accordingly (if that entry is already stored in the flow table). The entry associated with the second service module includes a characteristic identifier associated with a characteristic included in the second data unit.

In some embodiments, at some time after sending the second data unit, the edge device 181 is configured to receive a third data unit from a source peripheral processing device (e.g., the peripheral processing device 113, the peripheral processing device 114). The third data unit includes the same characteristic as the second data unit. Similar to the method described herein, the edge device 181 can be configured to identify the second service module for the third data unit based on the entry associated with the second service module in the flow table. Specifically, the characteristic included in the third data unit can be identified in the entry. As a result, the second service module can be identified to perform the desired service on the third data unit.

In some embodiments, after the edge device 181 sends the first data unit to the service module at the peripheral processing device 115 such that a desired service (e.g., a firewall service, a load balancing service) is performed at the service module, the edge device 181 can be configured to perform the desired service on appropriate data units at the edge device 181. Specifically, the peripheral processing device 115 can be configured to send an indication associated with the desired service to the edge device 181. Such an indication can include, for example, a command or instruction associated with performing the desired service. In response to the indication, the edge device 181 can be configured to modify or configure, for example, a service execution module (e.g., the service execution module 356 of the edge device 300 in FIG. 3) of the edge device 181 such that the service execution module can perform the desired service on data units at the edge device 181. Meanwhile, the edge device 181 can be configured to store the association between the desired service and a characteristic included in the first data unit in a flow table at the edge device 181. In some embodiments, such a flow table is different from the flow table that stores associations among service modules, characteristics included in data units and counter values, as shown and described with respect to FIG. 6.

FIG. 7 is a schematic illustration of a flow table 700 implemented at a source edge device, which is used to store associations between services performed at that source edge device and characteristics included in data units, according to an embodiment. The source edge device can be similar to the edge devices 181-183 in FIG. 1 and the edge device 300 in FIG. 3. The flow table 700 can be implemented in a memory of the source edge device similar to the flow table 354 implemented in the memory 350 of the edge device 300 in FIG. 3. The source edge device can be included in a switch fabric system (e.g., the switch fabric system 100 in FIG. 1), and thus operatively coupled to other devices (e.g., other edge devices, peripheral processing devices) associated with the switch fabric system. As shown in FIG. 7, the flow table 700 includes two columns: service identifier (ID) 710 and characteristic identifier (ID) 720.

The first column, service ID 710, stores identifiers (e.g., 100, 120, 250, $S_N$) of services that can be performed on data units at the source edge device. Each identifier of a service uniquely identifies that service. For example, the service identifier 100 identifies a firewall service that is performed on data units at the source edge device (e.g., by a service execution module of the source edge device). For another example, the service identifier 120 identifies a load balancing service that is performed on data units at the source edge device (e.g., by the service execution module of the source edge device).

Each entry of the second column, characteristic ID 720, stores an identifier (e.g., 10, 17, 54, $CID_N$) of a characteristic included in a data unit. Each characteristic identifier uniquely identifies that characteristic. For example, the characteristic identifier 10 identifies an identifier (e.g., an address) of a source peripheral processing device (or a destination peripheral processing device) for a data unit; the characteristic identifier 20 identifies a transfer protocol used for transmitting a data unit; the characteristic identifier 30 identifies a type of a data unit.

According to the flow table 700, the source edge device can be configured to perform a service identified by a service identifier stored in an entry of the service ID 710 on a data unit including the characteristic identified by the characteristic identifier stored in the entry of the characteristic ID 720 that corresponds to (i.e., in the same line) that entry of the service ID 710. For example, the source edge device can be configured to perform the firewall service identified by the service identifier 100 on a data unit received from the source peripheral processing device, which is a characteristic identified by the characteristic identifier 10. For another example, the source edge device can be configured to perform the load balancing service identified by the service identifier 120 on a data unit received based on the transfer protocol, which is a characteristic identified by the characteristic identifier 20.

In some embodiments, values and associations stored in the flow table 700 can be changed (e.g., inserted, modified, updated, removed, etc.) automatically (e.g., triggered by a reception of an indication) or manually (e.g., by an operator or administrator of the switch fabric system). For example, in response to receiving an indication associated with a firewall service, the source edge device can be configured to define an entry in the flow table 700, which associates the service identifier of the firewall service with a characteristic identifier associated with a characteristic included in data units that are designated for the firewall service. For another example, in response to the source edge device not receiving any data unit having a characteristic, the source edge device can be configured to remove, from the flow table 700, an entry that associates the characteristic identifier of the characteristic with the service identifier of a load balancing service that is desired for data units including the characteristic.

Returning to FIG. 1, in response to receiving the indication associated with the desired service performed on data units at the peripheral processing device 115, the edge device 181 can be configured to define an entry in the flow table to store the association between the desired service and the characteristic included in the first data unit. Meanwhile, the service execution module of the edge device 181 is configured or modified such that the service execution module can perform the desired service on data units at the edge device 181.

For example, the edge device 181 is configured to receive a fourth data unit having the same characteristic as the first data unit. Same as the first data unit, the fourth data unit is sent from the peripheral processing device 113 and destined to the peripheral processing device 111. Based on the newly-defined entry in the flow table, the service execution module of the edge device 181 is configured to perform the desired service on the fourth data unit without sending the fourth data unit to the peripheral processing device 115 or any other service module. The edge device 181 is then configured to send the fourth data unit to the peripheral processing device 111 via the data path 176 as shown in FIG. 1.

Figure 8:
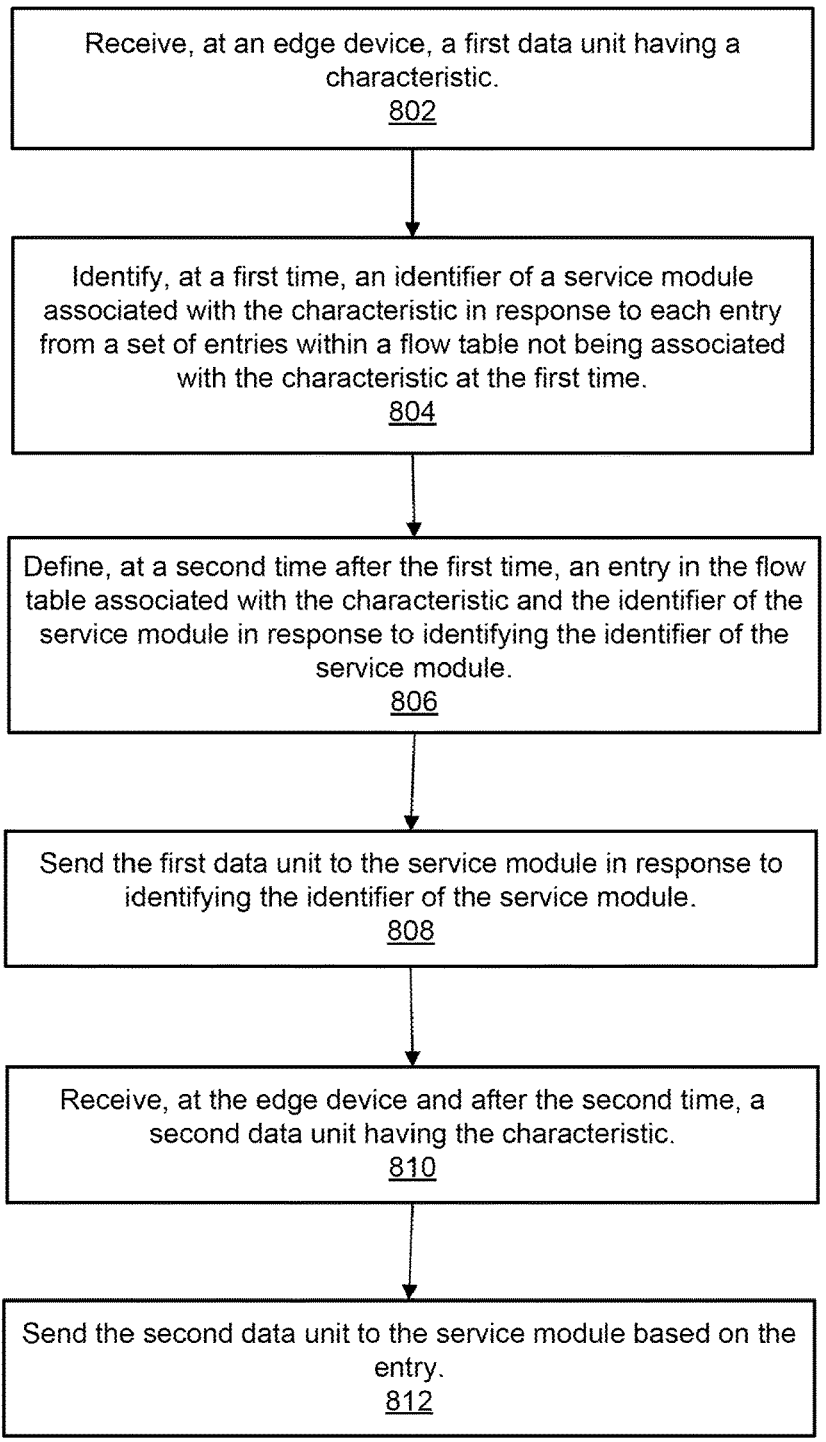
FIG. 8 is a flow chart illustrating a method for identifying a service module to perform a service on data transmitted across a distributed switch fabric, according to an embodiment.

FIG. 8 is a flow chart illustrating a method 800 for identifying a service module to perform a service on data transmitted across a distributed switch fabric, according to an embodiment. The method 800 can be performed at an edge device that is structurally and functionally similar to the edge devices 181-183 and the edge device 300 shown and described with respect to FIGS. 1 and 3, respectively. Particularly, instructions associated with performing the method 800 can be stored within a non-transitory processor-readable medium in a memory of the edge device (e.g., the memory 350 of the edge device 300 in FIG. 3). The non-transitory processor-readable medium stores code representing instructions (including the instructions associated with performing the method 800) to be executed by a processor of the edge device (e.g., the processor 330 of the edge device 300 in FIG. 3). Furthermore, similar to the edge devices 181-183 in FIG. 1, the edge device performing the method 800 can be associated with a distributed switch fabric (e.g., the switch fabric 110 in FIG. 1) and operatively coupled to one or more peripheral processing devices (e.g., the peripheral processing devices 111-116 in FIG. 1).

The method 800 includes receiving a first data unit having a characteristic, at 802. In some embodiments, such a characteristic can include, for example, an identifier of a source peripheral processing device, an identifier of a destination peripheral processing device, a type of the first data unit, a protocol associated with the first data unit, any other suitable characteristic or a combination of any of the above characteristics.

At 804, the edge device can be configured to identify, at a first time, an identifier of a service module associated with the characteristic in response to each entry from a set of entries within a flow table not being associated with the characteristic at the first time. That is, the edge device can be configured to search the flow table and based on the search result, to determine that the characteristic is not included in or associated with any entry of the flow table. The flow table can be similar to the flow table 600 shown and described with respect to FIG. 6. Thus, the edge device is not able to identify a service module to perform a desired service (e.g., a firewall service, a load balancing service) on the first data unit based on the flow table. As a result, the edge device is configured to identify the service module to perform the desired service on the first data unit using some other method. For example, the edge device can be configured to identify the service module based on a hash function using the characteristic and/or other information included in the first data unit as an input to the hash function.

At 806, the edge device can be configured to define, at a second time after the first time, an entry in the flow table associated with the characteristic and the identifier of the service module in response to identifying the identifier of the service module. Specifically, the edge device can be configured to store a characteristic identifier of the characteristic and the identifier of the service module, and/or other information or data (e.g., a counter value) associated with the service module within the entry.

At 808, the edge device can be configured to send the first data unit to the service module in response to identifying the identifier of the service module. As a result, the service module can perform the desired service on the first data unit, and then send the first data unit to a destination peripheral processing device of the first data unit.

At 810, the edge device can be configured to receive a second data unit having the characteristic after the second time. In some embodiments, the second data unit can be from a data stream that includes the first data unit. In other embodiments, the second data unit can be from a data stream different than that includes the first data unit.

At 812, the edge device can be configured to send the second data unit to the service module based on the entry. Specifically, the edge device can be configured to identify the service module based on the identifier of the service module being associated with the characteristic identifier of the character in the entry. As a result, similar to the scenario of the first data unit, the edge device can be configured to send the second data unit to the service module, such that the service module can perform the desired service on the second data unit and then send the second data unit to a destination peripheral processing device of the second data unit.

Although some embodiments are shown and described above with respect to FIGS. 1-8 as including edge devices capable of identifying services and selecting service modules for data transmitted or to be transmitted across a switch fabric, it should be understood that other embodiments are possible. In some embodiments, for example, a peripheral processing device can be capable of performing at least a portion of identifying services and selecting service modules. For example, a peripheral processing device can be configured to store and maintain a flow table that associates desired services and service modules to perform the desired services with characteristics of data units. As a result, such a peripheral processing device can be configured to identify services and/or identify service modules for the identified services. In some embodiments, for example, peripheral processing devices capable of identifying services and service modules can be interconnected by a multi-path network having multiple switch nodes without any edge device.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code. Such computer code can also be referred to as a computer program and some embodiments can be in the form of a computer program.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

What is claimed is:

1. A non-transitory processor-readable medium storing code representing instructions to be executed by a processor, the code comprising code to cause the processor to:
   receive, at an edge device, a first data unit having a first characteristic of a characteristic type, the first characteristic including information relating to the first data unit;
   determine whether the first characteristic from the first data unit is associated with at least one of a plurality of identifiers of service modules stored in a flow table at the edge device, the flow table including a service module counter value for a first service module, the counter value being representative of usage of the first service module;
   identify, at a first time, an identifier of the first service module to associate with a characteristic identifier code identifying the characteristic type of the first characteristic in response to each entry from a set of entries within the flow table not being associated with the characteristic identifier code for the first characteristic at the first time;
   define an entry in the flow table associated with the characteristic identifier code for the first characteristic and the identifier of the service module in response to identifying the identifier of the first service module;
   send the first data unit to the first service module in response to identifying the identifier of the first service module;
   receive, at the edge device and at a second time after the first time, a second data unit having a second characteristic of the characteristic type, the second characteristic being associated with the characteristic identifier code;
   map the characteristic identifier code to the identifier of the first service module using the entry in the flow table;
   send the second data unit to the first service module based on the entry in the flow table and not a second service module when the service module counter value fails to satisfy a predetermined threshold; and
   send the second data unit to the second service module based on the entry in the flow table and not the first service module when the service module counter value satisfies the predetermined threshold.

2. The non-transitory processor-readable medium of claim 1, wherein the first service module is associated with at least one of a security service or a load balancing service.

3. The non-transitory processor-readable medium of claim 1, wherein the first characteristic includes at least one of an identifier of a source peripheral processing device, an identifier of a destination peripheral processing device, a type of the first data unit, or a protocol associated with the first data unit.

4. The non-transitory processor-readable medium of claim 1, further comprising code to cause the processor to:

remove the entry from the flow table in response to not receiving a third data unit having the characteristic identifier code for the first characteristic within a predetermined time period after receiving the second data unit.

5. The non-transitory processor-readable medium of claim 1, wherein the code to cause the processor to identify includes code to cause the processor to identify the identifier of the first service module at the first time based on a hash function using at least one of an identifier of a source peripheral processing device, an identifier of a destination peripheral processing device, a type of the first data unit, or a protocol associated with the first data unit as an input.

6. The non-transitory processor-readable medium of claim 1, wherein the code to cause the processor to identify includes code to cause the processor to identify the identifier of the first service module based on a hash function, the code to cause the processor to send the second data unit includes code to cause the processor to send the second data unit to the first service module based on the entry and without using the hash function.

7. An apparatus, comprising:
an edge device configured to receive, from a first peripheral processing device, a first data unit, the edge device configured to identify an identifier of a first service module associated with a service to be provided on the first data unit by mapping a characteristic identifier associated with a characteristic associated with the first data unit to an entry in a flow table associated with the characteristic identifier and a first service module and stored at the edge device, the flow table including a first service module counter value for the first service module and a second service module counter value for the first service module, the first service module counter value being representative of a rate associated with usage of the first service module and the second service module counter value being representative of an accumulated number associated with the usage of the first service module, the characteristic identifier being header data related to the first data unit, the characteristic identifier being a code identifying a characteristic type, the characteristic associated with the first data unit being of the characteristic type, the edge device configured to send the first data unit to the first service module based on identifying the identifier of the first service module and at least one of the first service module counter value or the second service module counter value, the edge device configured to receive, from a second peripheral processing device, a second data unit including a characteristic associated with the second data unit, a characteristic type associated with the second data unit corresponding to the characteristic type associated with the first data unit, the characteristic associated with the second data unit being associated with the characteristic identifier, the edge device configured to identify the identifier of the first service module associated with the service to be provided on the second data unit by mapping the characteristic identifier to the entry in the flow table with the characteristic identifier and the first service module stored at the edge device, the edge device configured to send the second data unit to a second service module different from the first service module based at least in part on the edge device sending the first data unit to the first service module.

8. The apparatus of claim 7, wherein the edge device is configured to send the first data unit to the first service module via a distributed switch fabric such that the first service module sends the first data unit to a third peripheral processing device via the distributed switch fabric.

9. The apparatus of claim 7, wherein the edge device is configured to receive the second data unit at a first time, the edge device configured receive a third data unit from the second peripheral processing device at a second time after the first time, the edge device configured to send the third data unit to the second service module based at least in part on the edge device sending the second data unit to the second service module.

10. The apparatus of claim 7, wherein the edge device is configured to store an association between the identifier of the first service module and the characteristic identifier in a flow table, the edge device configured to send the second data unit to the second service module and not the first service module based at least in part on the association.

11. The apparatus of claim 7, wherein the edge device is configured to store an association between the identifier of the first service module and the characteristic identifier in a flow table, the edge device configured to load balance data between a plurality of service modules including the first service module and the second service module based at least in part on the association.

12. The apparatus of claim 7, wherein the edge device is configured to receive, from the first peripheral processing device and during a time period, a plurality of data units including the first data unit, the edge device configured to receive the second data unit after the time period, the edge device configured to send the second data unit to the second service module and not the first service module based at least in part on a rate at which the edge device sends data units from the plurality of data units to the first service module.

13. The apparatus of claim 7, wherein the service is at least one of a security service or a load balancing service.

14. The apparatus of claim 7, wherein the characteristic associated with the first data unit includes at least one of an identifier of the first peripheral processing device, an identifier of a destination peripheral processing device, a type of the first data unit, or a protocol associated with the first data unit.

15. The apparatus of claim 7, wherein the second peripheral processing device is different from the first peripheral processing device.

16. The apparatus of claim 7, wherein the second peripheral processing device is the first peripheral processing device.

17. An apparatus, comprising:
an edge device configured to receive a first data unit, the edge device configured to identify an identifier of a service module associated with a service to be provided on the first data unit by mapping a first characteristic identifier for a first characteristic associated with the first data unit to a first entry in a flow table associated with the service module and stored at the edge device, the flow table includes (1) a first counter value for the service module and associated with the first characteristic identifier, and (2) a second counter value for the service module associated with a second characteristic identifier and not the first characteristic identifier, the second characteristic identifier being associated with a second characteristic different form the first characteristic, the first counter value being representative of usage of the service module for data associated with the first characteristic identifier, the second counter value being representative of usage of the service module for data associated with the second characteristic identifier and not the first characteristic identifier, the first characteristic identifier being a code identifying a first type of characteristic, the second characteristic identifier being a code identifying a second type of characteristic different from the first type of characteristic, the edge device configured to send the first data unit to the service module such that the service module performs the service on the first data unit, the edge device configured to receive, from the service module and in response to performing the service on the first data unit, an indication associated with the service provided on the first data unit, the edge device configured to receive a second data unit having the first characteristic identifier for the first characteristic, the edge device configured to perform the service on the second data unit in response to receiving the indication without sending the second data unit to the service module.

18. The apparatus of claim 17, wherein the edge device is configured to store an association between the first characteristic identifier for the first characteristic and the indication associated with the service in a flow table in response to receiving the indication, the edge device configured to perform the service on the second data unit in response to the association with the service.

19. The apparatus of claim 17, wherein the edge device is configured to send the first data unit to the service module via a distributed switch fabric such that the service module sends the first data unit to a peripheral processing device via the distributed switch fabric, the edge device configured to send the second data unit to the peripheral processing device via the distributed switch fabric without sending the second data unit to the service module.

20. The apparatus of claim 17, wherein the edge device is configured to store an association between the first characteristic identifier for the first characteristic and the indication associated with the service in a flow table in response to receiving the indication, the edge device configured to remove the association with the service between the first characteristic identifier for the first characteristic and the indication in response to the edge device not receiving data having the first characteristic identifier for the first characteristic for a predetermined time period.

21. The apparatus of claim 17, wherein the first characteristic includes at least one of an identifier of a source peripheral processing device, an identifier of a destination peripheral processing device, a type of the first data unit, or a protocol associated with the first data unit.

22. The non-transitory processor-readable medium of claim 1, the code further comprising code to cause the processor to update the service module counter for the first service module after the second data unit is sent to the first service module.

23. The apparatus of claim 17, wherein a value of the first characteristic identifier is 37, the first characteristic identifier indicating that the first characteristic associated with the first data unit is a destination peripheral processing device address.

24. The non-transitory processor-readable medium of claim 1, wherein the counter value is a first counter value, the flow table further including a second service module counter value for the first service module, the second service module counter being representative of an accumulated number of data units that have been sent to the first service module for service during a specific period of time.

25. The apparatus of claim 7, wherein the flow table is stored at the edge device.

26. The apparatus of claim 7, wherein the flow table is stored at the first peripheral processing device.

* * * * *